United States Patent [19]
Koike

[11] Patent Number: 5,993,020
[45] Date of Patent: *Nov. 30, 1999

[54] LIGHT SCATTERING AND GUIDING LIGHT SOURCE DEVICE AND LIQUID CRYSTAL DISPLAY

[75] Inventor: Yasuhiro Koike, Yokohama, Japan

[73] Assignee: Nitto Jushi Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/857,541

[22] Filed: May 16, 1997

Related U.S. Application Data

[63] Continuation of application No. 08/403,880, filed as application No. PCT/JP94/01201, Jul. 21, 1994, abandoned.

[30] Foreign Application Priority Data

Jul. 23, 1993 [JP] Japan ................................. 5-201990

[51] Int. Cl.⁶ .................................................. G02B 6/26
[52] U.S. Cl. ............................................. 362/31; 362/330
[58] Field of Search .................................. 362/26, 31, 330

[56] References Cited

U.S. PATENT DOCUMENTS

| | | | |
|---|---|---|---|
| 4,277,817 | 7/1981 | Hehr | 362/31 |
| 4,914,553 | 4/1990 | Hamada et al. | 362/31 |
| 5,050,946 | 9/1991 | Hathaway et al. | |
| 5,055,978 | 10/1991 | Rogoff | 362/31 |
| 5,146,354 | 9/1992 | Plesinger | 362/31 |
| 5,394,255 | 2/1995 | Yokota et al. | 362/31 |
| 5,408,388 | 4/1995 | Kobayashi et al. | 362/31 |
| 5,899,552 | 5/1999 | Yokoyama et al. | 362/31 |

FOREIGN PATENT DOCUMENTS

| | | |
|---|---|---|
| 0 275 858 | 7/1988 | European Pat. Off. . |
| 0 453 092 | 10/1991 | European Pat. Off. . |
| 63-208001 | 8/1988 | Japan . |
| 2-132702 | 5/1990 | Japan . |
| 2-221925 | 9/1990 | Japan . |
| 4-140783 | 5/1992 | Japan . |
| 4-145485 | 5/1992 | Japan . |
| 5-33129 | 4/1993 | Japan . |
| 6-324330 | 11/1995 | Japan . |
| 06509 | 4/1993 | WIPO . |

OTHER PUBLICATIONS

IBM Technical Disclosure Bulletin, vol. 24, No. 11A, Apr. 1982, pp. 5368–5370, J.C. Wood, "Optimized Wedge Illuminator for a Liquid–Filled Passive Display".

IBM Technical Disclosure Buletin, vol. 33, No. 9, Feb. 1, 1991, p. 261/262 XP 000109498, "High Efficiency Back Light For LCD".

Patent Abstracts of Japan, vol. 16, No. 418 (P–1413), Sep. 3, 1992 & JP–A–04140783 (Sumitomo).

*Primary Examiner*—Laura Tso
*Attorney, Agent, or Firm*—Staas & Halsey

[57] ABSTRACT

A light scattering and guiding light source device which is capable of providing a uniform illumination light, simple structure and low cost. A wedge-shaped light scattering guide has an incident surface for introducing light rays from a fluorescent lamp. The directions of the rays are changed by scattering. The rays propagate through the body while reflected repeatedly. Parts of the rays go outwards at plural reflective points. The angle of reflection increases successively, thus increasing the possibility that the light exits from the exit surface. This effect cancels another effect that portions close to the light source shines strongly. Both effects are balanced to make uniform the brightness over the exit surface. Reflective sheets are disposed along the inclined surface and around the fluorescent lamp to keep the brightness high. A prismatic exit direction modifier giving on the light exit surface is employed to modify the light exit direction characteristic. The light source device is mounted on a liquid crystal display as a backlight source to provide an improved display quality.

8 Claims, 5 Drawing Sheets

LIGHT SCATTERING AND GUIDING LIGHT SOURCE DEVICE AND LIQUID CRYSTAL DISPLAY

This application is a continuation of application Ser. No. 08/403,880, filed Mar. 21, 1995, now abandoned, which is a 371 of PCT/JP94/01201 filed Jul. 21, 1994.

TECHNICAL FIELD

The present invention relates to a light source device using a light scattering guide for guiding incident light while scattering it and also to a liquid crystal display using it as a backlight source.

BACKGROUND ART

Various kinds of optical elements and devices for directing light to desired direction, by making use of scattering, have been known heretofore. These optical elements and devices are employed as backlight sources of liquid crystal display and other applications.

According to one kind of these known optical elements and devices, a surface light source is used as a backlight source of liquid crystal display or the like, wherein light is introduced from one flank of a transparent material in the form of an extended plate with a light reflective element disposed at one side and light diffusing property is given to the other side of the transparent material.

In surface light sources using such light scattering and guiding light source, light is not scattered in three dimensions inside the transparent body and only the direction of light exit is spread by utilizing diffuse reflection and specular reflection near or at the surface of the transparent body or reflective element, with the result. Therefore, it is difficult, in principle, to sufficiently enhance the ratio of the scattering light that can be extracted from the light scattering and guiding device.

Where it is attempted to obtain a surface light source which receives light from one side and produces uniform brightness, some gradient must be imparted to the reflecting power of the reflecting element. This makes the structure of the light scattering and guiding device complex and bulky. Also, the manufacturing cost is increased. Therefore, where this type of light scattering and guiding light source device is used as a backlight source for a crystal display, some of the requirements, i.e., high brightness, high uniformity of brightness as surface light source, sufficiently reduced thickness, and excellent economy, must be sacrificed.

In view of these problems, some improved elements and devices for scattering and guiding light have been proposed. In particular, particles of material having a refractive index different from that of a transparent material in the form of an extended plate is dispersed in the transparent material to cause three dimensional scattering.

For example, in Japanese Patent Laid-Open Nos. 221925/1990 and 145485/1992, a backlight for a liquid crystal display is disclosed, wherein light is supplied to a flank of a light scattering and guiding plate and a light reflecting element is disposed at the side of the light scattering and guiding plate, while the opposite surface is used as a light exit surface.

When this type of light scattering and guiding element (an element intrinsically capable of scattering and guiding light) and a light source are conventionally combined to provide a light scattering and guiding device, some means are applied to get a flat intensity distribution of the light taken out of the light exit surface, wherein said means includes a graded density of particles dispersed in the light scattering and guiding element to increase the scattering power per unit volume at portions distant from the light source or a graded density of mesh or dot patterns of light diffusing ink applied to the backside of the light scattering and guiding element.

These additional technical means requires costs and provides a poor improvement in uniformity of brightness.

According to Japanese Patent Laid-Open No. 140783/1992, the thickness of a light scattering guide is increased at portions distant from the light source to make the brightness uniform, and according to Japanese Patent Application No. 102011/1993 (invented by the inventor of the present invention), two wedgeshaped light scattering guides having different scattering powers are combined to provide one light scattering and guiding device.

In the former method, however, the light incident surface of the light scattering guide has a small area, with the result that a transparent light guide is needed in order to compensate for this small area and a high light taking out efficiency from the light exit surface as viewed from the direction of the front surface is not be expected (It is guessed that a considerable portion of light incident on the transparent light guide body from the light source element is consumed without changing its direction to cross the light exit surface at a large angle.). In the latter technique proposed by the inventor of the present invention, the whole light scattering and guiding device exhibits light scattering power and a gradient is imparted to the cross sectional average scattering power, thereby improving the uniformity. Therefore, where the light exit surface is viewed from the front side, both light taking out efficiency and brightness are high. However, at least two light scattering guides of different scattering powers must be prepared and joined together. Hence, it cannot be said that the structure, the dimensions, and the manufacturing steps have been ideally simplified.

SUMMARY OF THE INVENTION

Accordingly, it is a fundamental object of the present invention to provide a light scattering and guiding light source device which is quite simple in structure but permits light to be taken out of the light source device at a high efficiency with high uniformity from and around the direction at right angles to the light exit surface, whereby solving all the problems with the prior art techniques.

It is a second object of the invention to provide a liquid crystal display which uses the light source device described in the preceding paragraph and accomplishes a bright viewing screen having high display quality.

The fundamental object described above is achieved by a light scattering and guiding light source device, said light source device comprising: a light scattering guide having at least one light incident surface area and at least one light exit surface area; and a light source means for supplying light to the light incident surface area. The thickness of the light scattering guide tends to be reduced with the increasing of distance from the light incident surface. The light exit direction characteristics from the light exit surface is modified by disposing a light exit direction modifying means for modifying the light exit direction characteristics. The modifying means gives on the light exit surface area of the light scattering guide and is mounted integrally with, or independent of the guide.

The aforementioned second object is achieved by a liquid crystal display having a backlight source mounted on the rear side of a liquid crystal display panel, the backlight source being composed of a light scattering guide and a light source means for supplying light through the light incident surface area. The light scattering guide has at least one light incident surface area and at least one light exit surface area and a region whose thickness tends to decrease with the increasing distance from the light incident surface.

The present invention is based on a novel finding that light can be extracted at a high taking out efficiency and with high uniformity to or around the direction at right angles to the light exit surface area (hereinafter referred to as front direction) by imparting the above-described feature in shape (i.e., the tendency of decreasing thickness with the increasing distance from the light incident surface area) to the light scattering guide.

This technical concept is distinctly distinguished from the prior art concept in which techniques based on a graded scattering power or the like.

DETAILED DESCRIPTION OF THE INVENTION

Figure 1:
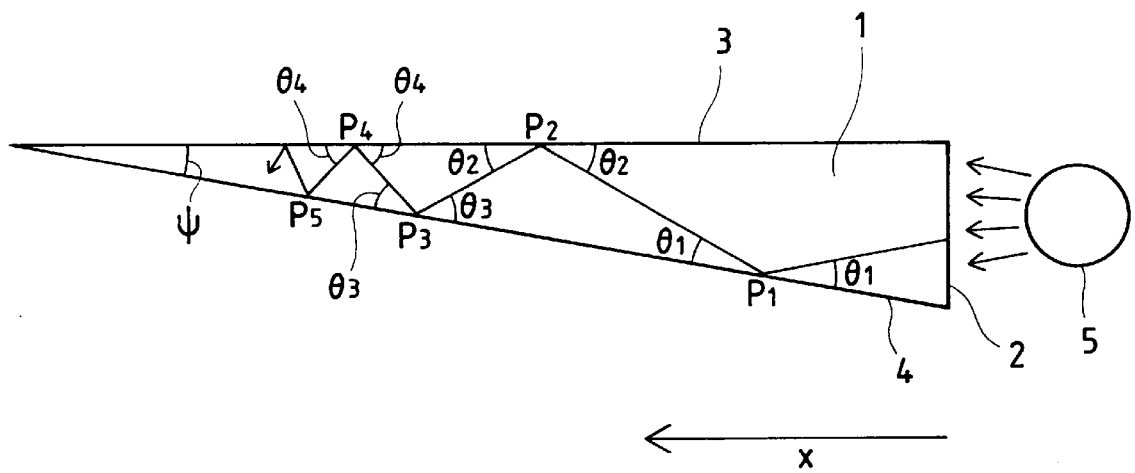
FIG. 1 is a cross-sectional view of the fundamental arrangement of a light scattering guide and a light source element in accordance with the present invention.

The fundamental concept of the present invention is described first by referring to FIG. 1 which illustrates a cross section of the fundamental arrangement of a light scattering guide and a light source in accordance with the present invention. The light scattering guide, indicated by reference numeral 1, has a light incident surface 2, a light exit surface 3, and an inclined surface 4. A light source element 5 such as a fluorescent lamp supplies light flux to the light scattering guide 1 through the incident surface 2.

The light scattering guide 1 is a wedge-shaped block which is obtained by giving a uniform scattering power in three-dimensions to a transparent body made of an organic or inorganic material, said scattering power being based on adding of particles having refractive index different from that of the transparent body to the transparent body, by kneading of materials having refractive index different each other or by producing a irregularity in refractive index through a polymerization process. The present invention places no limitation on the material of the light scattering guide as long as it guides light over a considerable distance while scattering a part of the light.

In the illustrated arrangement, the principal component of the light introduced to the light scattering guide 1 through the light incident surface 2 is expected to make a small angle with respect to the horizontal direction, as indicated by the arrows. Now, assuming that light ray A represents the light flux introduced to the light scattering guide 1, the behavior of the light rays is as follows.

The direction of the typical light ray A introduced to the light scattering guide 1 is changed at a certain ratio by scattering and, at the same time, is reflected back and forth between the light exit surface 3 and the inclined surface 4, approaching the end portion of the light scattering guide 1. A part of the light is made to go outwards at each of reflection points $P_1$, $P_2$, $P_3$, and so on.

If a mirror is disposed on the inclined surface 4, most of the light is returned into the light scattering guide 1. At the reflection points $P_1$, $P_2$, $P_3$, etc., light is specularly reflected as indicated by $\theta_1$, $\theta_2$, $\theta_3$, etc. Because surfaces 3 and 4 are not parallel to each other, the angle θ increases gradually with the increasing number of reflections. Therefore, the possibility that light leaves the light exit surface 3 increases. Hence, this effect is referred to here as multiple reflection effect.

If the intensity of light going out of the light exit surface 3 is estimated by a function f(x) of the distance x from the light incident surface 2, the multiple reflection effect is a factor rendering the function f(x) an increasing function. On the other hand, in portions close to the incident surface 2, the effect of the proximity to the light source 5 acts on both direct light and scattered light, with the result that this effect is naturally a factor rendering the function f(x) a decreasing function.

The present invention is based on the finding that the function f(x) can be flattened by superimposing these two factors.

Because latter light source proximity effect has been considered to be a factor lowering the uniformity of brightness of the light scattering guide, a gradient is given to the scattering power of the light scattering guide or to the reflecting power over reflective points. According to the prior art concept, it follows that large thickness of the light scattering guide on the side of the light incident surface rather promotes the proximity effect. Hence, it would be natural to consider that the present concept is against the uniformity of brightness.

The present invention overthrows this conventional concept by making use of the above-described multiple reflection effect.

Since a larger angle ψ between surfaces 3 and 4 in FIG. 1 provides a tendency of rapidly increasing θ, a small angle ψ is preferable to exert the multiple reflection effect up to the end of the light scattering guide 1.

As the multiple reflection effect tends to be intensive in weak scattering power of the light scattering guide 1, it can be said that the novel light scattering and guiding light source has characteristics adapted for light source devices of a relatively large area.

Furthermore, the tendency of the increasing reflection angles $\theta_1$, $\theta_2$, $\theta_3$, etc. can be controlled by making the inclined surface 4 (in some cases, the light exit surface 3, too) curved to give a more preferable brightness distribution.

Since the novel light scattering and guiding light source device makes use of the multiple reflection effect as described above, light exits from the light exit surface at a relatively large exit angle. To impart a more desired direction characteristic to the outgoing light intensity, an exit direction modifying means utilizing prismatic effect can be used. The exit direction modifying means utilizing prismatic effect is described in detail in the disclosure of the above-cited Japanese Patent Application No. 102011/1993. The fundamental effect is now described briefly by referring to FIG. 2.

Figure 2:
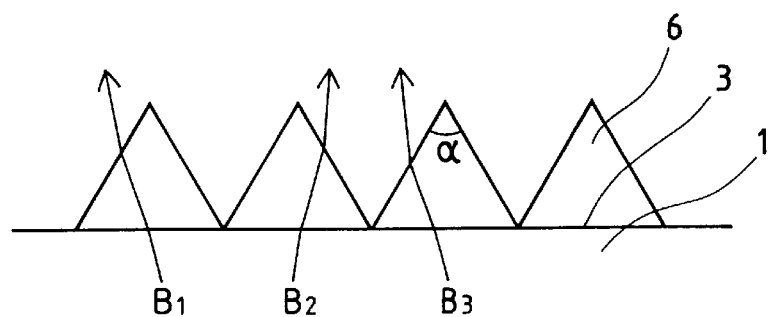
FIG. 2 is a diagram illustrating the effect of exit direction modifier (prismatic element) utilizing prismatic effect.

In FIG. 2, light rays $B_1$, $B_2$, and $B_3$ represent light rays going out of the light scattering and guiding light source 1 through the light exit surface 3 and prismatic elements 6. According to the Snell's law of refraction, the direction of propagation of the light rays $B_1$, $B_2$, and $B_3$ is modified to a direction perpendicular to the light exit surface 3. Various modification characteristics can be obtained by selecting various values as the vertical angles of the prismatic elements and as the refractive index. The exit direction modifying means may be a device independent of the light scattering and guiding light source 1 or alternatively, the light exit surface 3 may be made uneven (see the above-cited Japanese Patent Application).

The above-described effects of light scattering and guiding light source devices in accordance with the present invention can also be derived, of course, where such a light source device is installed as a backlight source behind a liquid crystal display element. Obviously, the light scattering and guiding light source device forming the backlight source emits light uniformly and brightly, so that the display quality on the liquid crystal display is improved. The light scattering guide used in the present invention is made smaller and lighter because of the presence of the region made thinner than conventional light scattering guides with same light incident surface area as the present invention, with the result that liquid crystal displays incorporating this is rendered more compact and lighter.

Specific examples of the method of fabricating the light scattering guide employed in the present invention and measured optical characteristics are described in detail below.

Four kinds of samples of MMA (methyl methacrylate) containing silicone resin particles 2 μm in diameter (TOSPEARL 120; trademark TOSHIBA SILLICONE Co., Ltd.) and another sample of MMA containing no particles were prepared, wherein said sillicone resin particles of 2 μm in diameter were dispersed uniformly in MMA samples to 0.05 wt %, 0.08 wt %, 0.10 wt %, and 0.15 wt %, respectively; thereafter to each of these five samples benzoyl peroxide (BPO) of 0.5 wt % as radical polymerization initiator and n-lauryl mercaptan (n-LM) as chain transfer agent were added and cast polymerization was performed for each sample at 70° C. for 24 hours to fabricate wedge-shaped light scattering guides each having the length of 68 mm, the width of 85 mm and a gradually varying thickness from 3.8 mm to 0.2 mm along the longitudinal direction.

Figure 3:
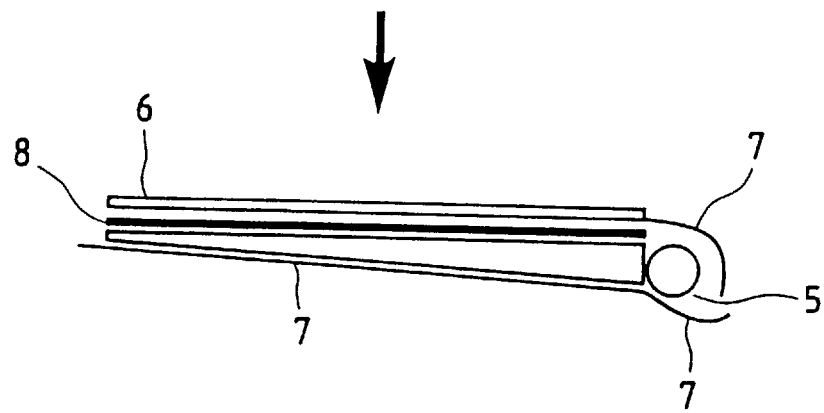
FIG. 3 is a cross-sectional view of a light scattering and guiding light source device comprising the fundamental arrangement shown in FIG. 1 and members attached thereto.

Five light scattering and guiding light source devices using these five light scattering guides, respectively, with the arrangement shown in FIG. 3 were fabricated. This arrangement was the same as the arrangement shown in FIG. 1 except that reflective sheets 7 made of silver foil were disposed along the inclined surface 4 and the rear surface of the light source element (fluorescent lamp) 5, and that prismatic exit direction modifiers 6 (vertical angle of each prismatic element; about 95°) were disposed to modify the direction of outgoing light to the just upward direction. A light diffusing sheet 8 was disposed between each exit direction modifier 6 and the light scattering guide 1 to promote light scattering.

Figure 4:
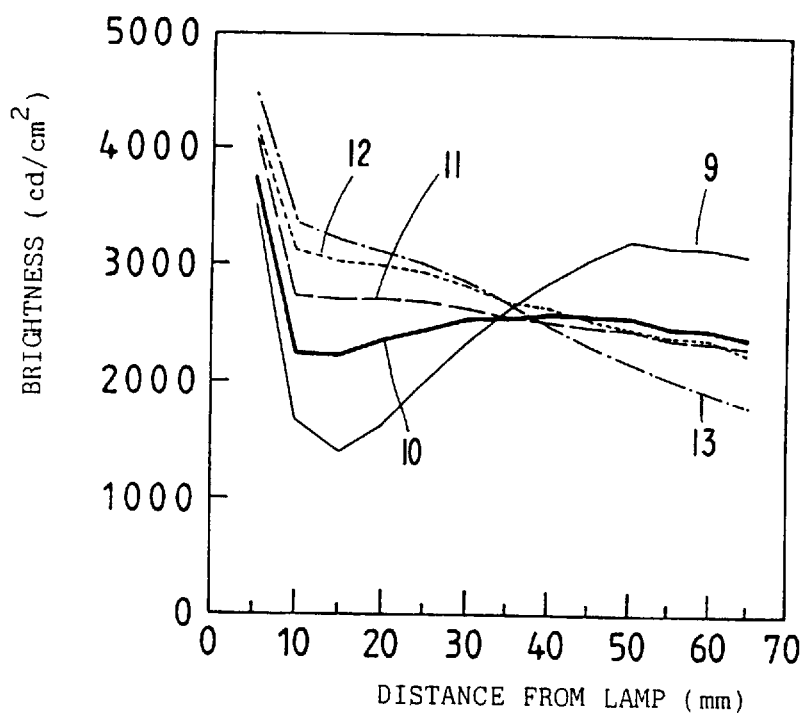
FIG. 4 is a graph showing the results of measurements of the brightness distribution for embodiments of light scattering and guiding light source devices (as shown in FIG. 3) in accordance with the present invention.

The brightness distribution on the side of the light exit surface 3 (the surface of the exit direction modifier 6) was measured at 10 locations along the horizontal direction in the figure for each sample with a calorimetric color difference meter (Model CS100; MINOLTA Co., Ltd.) from the front direction indicated by the arrow. The results are shown in FIG. 4. As understood from the graph, the transparent body having no scattering power (thin solid line 9) provides an increasing brightness with the increasing distance from the fluorescent lamp 5 except in a location quite close to the light source element. This result is considered to be an evidence demonstrating the aforementioned multiple reflection effect.

It can be clearly understood from the graph that the employment of light scattering guides with scattering power compensates for the decreases in brightness at locations relatively close to the light source element depending on the dispersed amount of TOSPEARL 120 silicon resin particles (depending on the increasing scattering power). It is understood that the sample containing 0.05 wt % of TOSPEARL-120 silicon resin particles (thick solid line 10) exhibits the flattest characteristic curve. These samples containing 0.08 wt. %, 0.10 wt. % and 0.12 wt. % silicone resin particles are represented respectively by dashed line 11, dotted line 12 and dash-dot-dash line 13. These results indicate that most portions, except portions several millimeters spaced from the light source element 5 expected to be affected strongly by the direct light from the light source element 5, can be used as a uniform surface light source.

Figure 5:
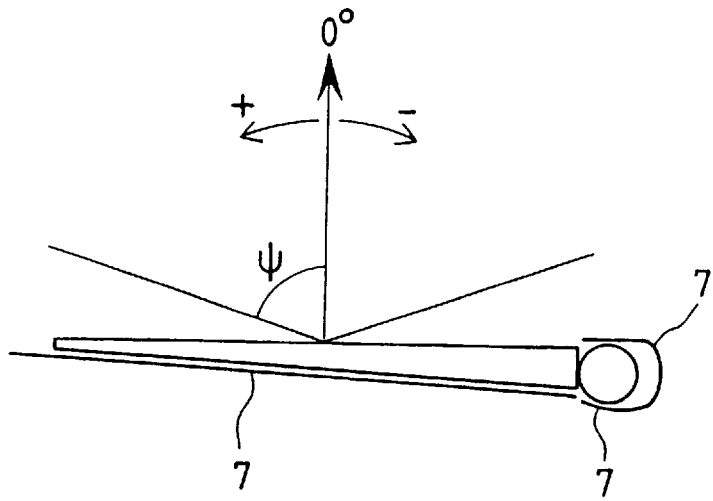
FIG. 5 is a diagram illustrating how to define the angles for the measurement of light exit direction characteristic of the light exit surface of the light scattering and guiding light source device.

Then, the light exit direction characteristic on the light exit surface 3 was measured as shown in FIG. 5 in order to prove the effect of the exit direction modifier 6, where the light scattering guide 1 containing 0.08 wt % of the TOSPEARL 120 silicone resin particles dispersed therein.

Figure 6:
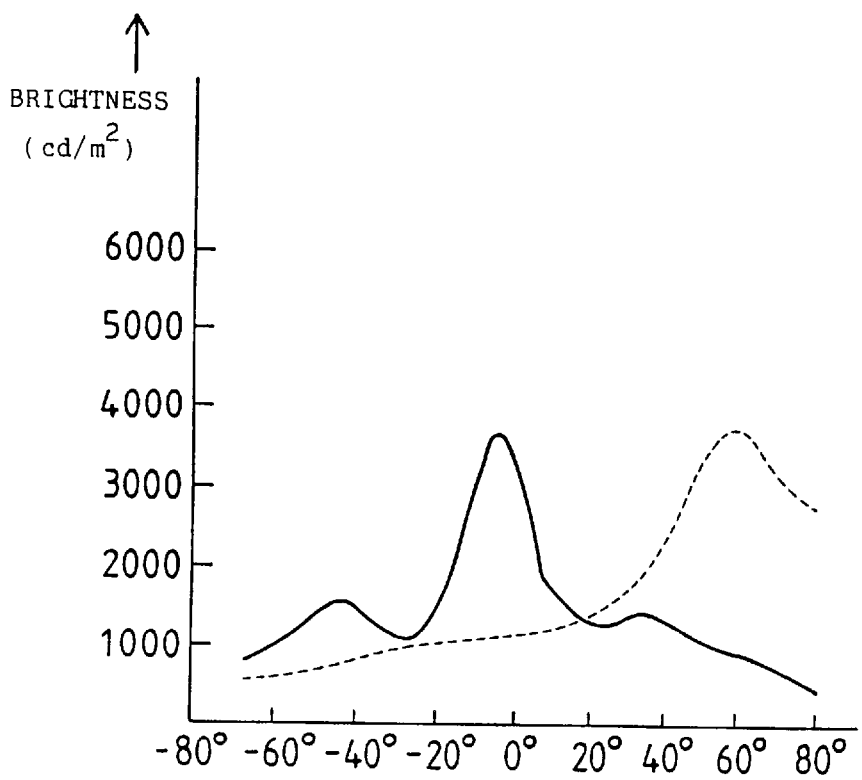
FIG. 6 is a graph showing the results of measurements of light exit direction characteristics of the light exit surface of the light scattering and guiding light sources some of which use prismatic devices, the others using no prismatic element.

FIG. 6 clearly illustrates the results showing the effect of the light exit direction modifier (prismatic element) on a sample containing 0.08 wt. % silicon resin particles. Thick solid line 14 and dotted line 15 respectively represent samples with and without a prismatic element. If the angle $\Psi\Psi=0°$ is defined as the direction just above the light exit surface 3 and + and – is defined as illustrated in FIG. 5, no employment of light exit direction modifier (prismatic element) provides the light intensity peak at a large $\Psi$ while the light intensity peak appears around the front direction.

Since the direction giving the light intensity peak varies depending on the size of irregularity structure of refractive index giving a scattering power to the light scattering guide (e.g., the diameter of particles having a different refractive index) and on the vertical angle of the prismatic element, desired exit direction characteristics can be obtained by selecting appropriate combinations of these factors.

It will be understood from the above description and from the results of experiments that the light scattering and guiding light source device shown in FIG. 5 does not limit the scope of the present invention, but rather various modifications are possible. Some of them are illustrated in FIGS. 7a to 7c, FIG. 8 and FIG. 9 in which ancillary members such as prismatic elements and the light-diffusing sheet are omitted. In practice, a light scattering and guiding light source device is built by appropriately adding these ancillary members.

Figure 7A:
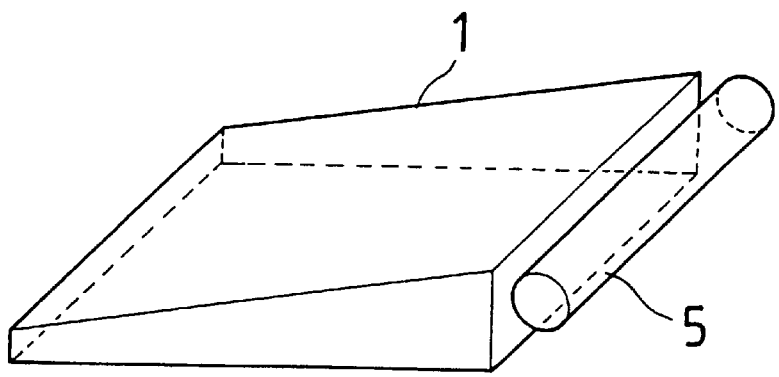
FIGS. 7a, 7b and 7c, exemplarily illustrate the shapes and arrangements of light scattering guides and light source elements employed in light scattering and guiding light source devices in accordance with the present invention.
Figure 7B:
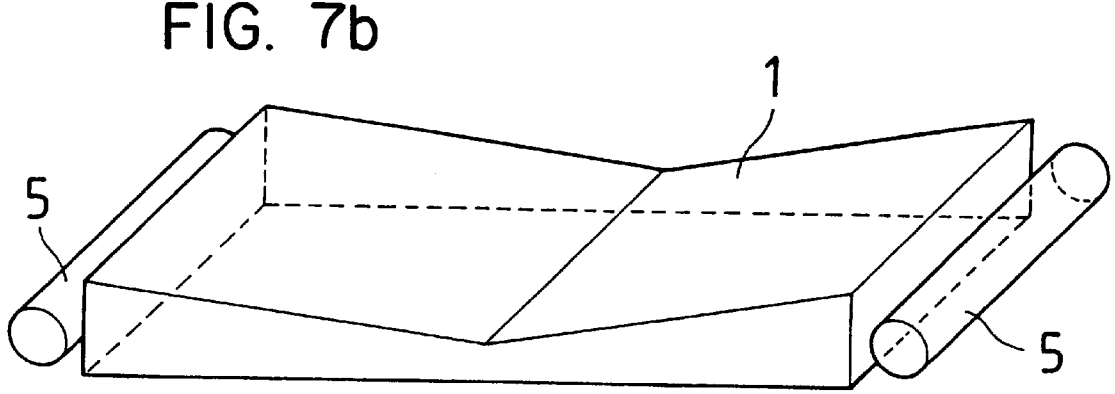
Figure 7C:
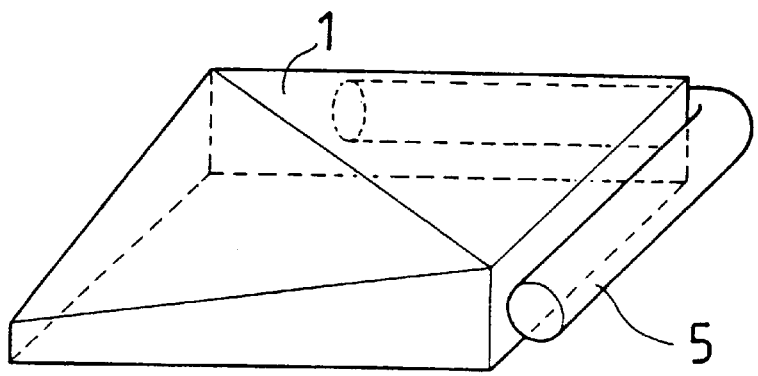

FIG. 7a corresponds to the fundamental arrangement shown in FIGS. 1 and 3. FIG. 7b shows a structure in which a light scattering guide 1 has a thinned central portion and light source elements (fluorescent lamp) 5 are mounted on opposite sides of the guide 1. FIG. 7c shows an arrangement in which a light scattering guide 1 has a region whose thickness is varied along the illustrated diagonal line and light source element (fluorescent lamp) is mounted along two adjacent sides of the light scattering guide 1.

Figure 8:
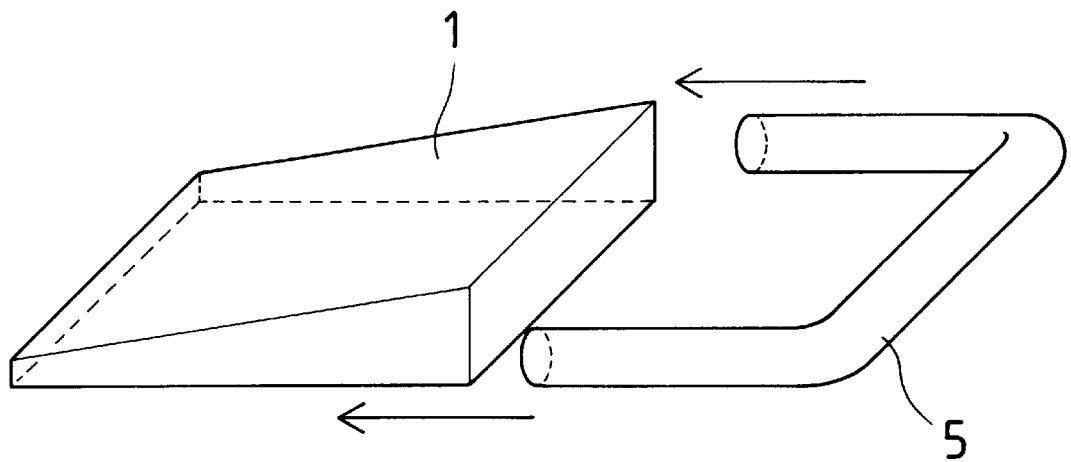
FIG. 8 illustrates another light scattering and guiding light source device in accordance with the present invention, wherein a U-shaped fluorescent lamp is employed.
Figure 9:
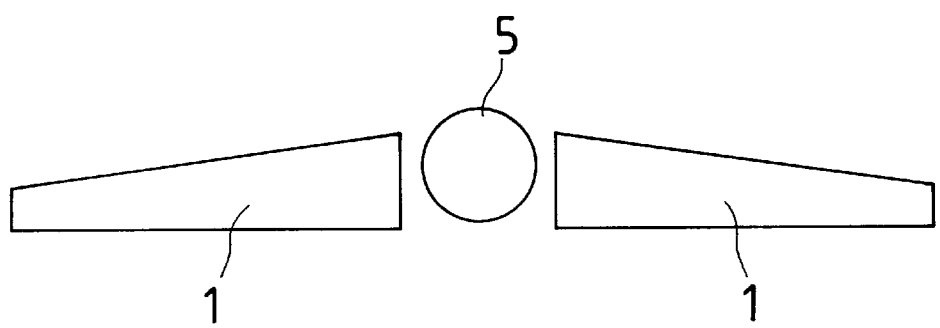
FIG. 9 illustrates still another light scattering and guiding light source device in accordance with the present invention, wherein one light source element is used for two light scattering guides.

In FIG. 8, a light scattering guide employing the fundamental structure shown in FIG. 7a is used and a U-shaped light source element (fluorescent lamp) 5 is used to reinforce brightness. Here in the figure, the U-shaped fluorescent lamp is shown in a position distant from the light scattering guide 1 as not yet assembled. This structure has the advantage that an electric power saving is expected owing to the characteristics of U-shaped fluorescent lamps. (One U-shaped fluorescent lamp consume a less amount of electric power than three separate short straight fluorescent lamps disposed in a U-shaped arrangement.) FIG. 9 is a cross section of an arrangement in which a single fluorescent lamp 5 is used for two light scattering guides 1. This concept can be extended to an arrangement in which many wedge-shaped light scattering guides 1 are arranged radially around a spherical light source element to provide a circular light source.

In any arrangement, both front and rear surfaces can be used as light exit surfaces. As described above, the brightness distribution can be adjusted by shaping the light scattering guide 1 into a wedge having a tapering inclined surface instead of a constant gradient in thickness. Furthermore, according to the principle of the present invention, the cross section of the light scattering guide may be shaped into an isosceles triangle.

Additionally, it will be understood naturally that the light scattering guides employable in the present invention is not limited to those obtained by the method described at the beginning of the embodiments. Other examples of manufacturing method and the results of measurements of the brightness distribution are described briefly below.

(1) Silicone resin particles (TOSPEARL 120; trademark TOSHIBA SILLICONE Co.,Ltd.) were dispersed uniformly in MMA (methyl methacrylate) to 0.08 wt %, wherein said sillicone resin particles are 2 $\mu$m in diameter; thereafter to it benzoyl peroxide (BPO) of 0.5 wt % as radical polymerization initiator and n-lauryl mercaptan (n-LM) as chain transfer agent were added and cast polymerization was performed at 70° C. for 24 hours to fabricate a wedge-shaped light scattering guide having the length of 68 mm, the width of 85 mm and a gradually varying thickness from 3.8 mm to 0.2 mm along the longitudinal direction.

For this sample, the distribution of brightness was measured under the same arrangement as shown in FIG. 3 (the vertical angle of the prismatic element 6 was 62°) and the result showed a uniformity of about 95% in brightness over almost whole of the light exit surface. With a commercially available fluorescent lamp used, the brightness was about 4000 candela. Another measurement of brightness was performed under the same conditions for an arrangement which comprised a commercially available light guide plate made of acrylic acid resin having a similar thickness to that of the light scattering guide employed in the above measurement; and the result showed about 2000 candela. (In the latter measurement, the light guide plate made of acrylic acid had a constant thickness of about 8 mm and a screenprinted light diffusing layer on the back side, while a light diffusing plate was disposed along the light exit surface.) This demonstrated that a light scattering and guiding light source device having a uniform brightness level about twice as high as conventional devices is realized by employing the light scattering guide used in the above embodiment.

(2) Silicone oil was dispersed uniformly in MMA (methyl methacrylate) to 0.025 wt % and thereto benzoyl peroxide (BPO) of 0.5 wt % as radical polymerization initiator and n-butyl mercaptan (n-BM) as chain transfer agent were added and a sol making process was performed at 70° C. for 30 minutes; thereafter a cast polymerization was performed at 65° C. for 24 hours to produce a light scattering guide having the length of 68 mm, the width of 85 mm and a gradually varying thickness from 3.8 mm to 0.2 mm along the longitudinal direction.

For this sample, the distribution of brightness was measured under the same arrangement as shown in FIG. 3 (the vertical angle of the prismatic element 6 was 62°) and the result showed a uniformity of about 90% in brightness over almost whole of the light exit surface. With a commercially available fluorescent lamp used, the brightness was about 3800 candela.

(3) Silicone resin particles of 2 $\mu$m in diameter (TOSPEARL 120; trademark TOSHIBA SILLICONE Co., Ltd.) were added to PMMA (polymethyl methacrylate) to 0.08 wt % and they were mixed in the V-shaped tumbler for 10 minutes, in Henscher mixer for 10 for 5 minutes. This were then melted and mixed up in a two-axis extruder at a cylinder temperature of 220–250° C. to form pellets through extrusion molding.

The pellets were injection-molded into two wedgeshaped light scattering guide by the use of an injection molding machine at a cylinder temperature of 220–250° C. to produce two light scattering guides having the length of 68 mm, the width of 85 mm and a gradually varying thickness from 3.8 mm to 0.2 mm along the longitudinal direction having the length of 68 mm, the width of 85 mm and a gradually varying thickness from 3.8 mm to 0.2 mm along the longitudinal direction.

These two guides were disposed opposite each other with two fluorescent lamps as shown in FIG. 7(ii). Then, the distribution of brightness was measured under the condition that the prismatic element and light diffusion sheet 7 were removed from the arrangement shown in FIG. 3 and the result showed a uniformity of about 95% in brightness over almost whole of the light exit surface showed a uniformity of about 95% in brightness over almost whole of the light exit surface.

With a prismatic element (having the vertical angle about 62°) and a light diffusion sheet used as in FIG. 3, another measurement performed in the same manner as the above measurement gave a result showing a more improved uniformity. With a commercially available fluorescent lamp used, the brightness was about 4100 candela.

(4) A wedge-shaped light scattering guide of the shape shown in FIG. 7(iii) was fabricated by the same method as described in item (2) above, the guide having the length of 68 mm and the width of 85 mm.

The brightness distribution was measured under the condition that the prismatic elements and the light diffusing sheet 7 were removed from the arrangement shown in FIG. 3 to give a result showing a uniformity of about 90% in brightness over almost whole of the light exit surface.

(5) Polytrifluoroethyl methacrylate (P3FMA) was added to MMA (methyl methacrylate) to 0.1 wt % and uniformly dispersed; thereafter to this sample benzoyl peroxide (BPO) of 0.5 wt % as radical polymerization initiator and n-lauryl mercaptan (n-LM) as chain transfer agent were added and suspension polymerization was performed for 24 hours. After the produced polymer was subject to heat-treatment and drying, it was extruded by the use of an two-axis extrude of 30 mm in diameter at a cylinder temperature of 220–250° C. to produce pellets.

The pellets were injection-molded into two wedgeshaped light scattering guide by the use of an injection molding machine at a cylinder temperature of 220–250° C. to produce a light scattering guide having the length of 68 mm, the width of 85 mm and a gradually varying thickness from 3.8 mm to 0.2 mm along the longitudinal direction.

This guide was disposed as shown in FIG. 7(i) and the distribution of brightness was measured under the condition that the prismatic element and light diffusion sheet 7 were removed from the arrangement shown in FIG. 3 and the result showed a uniformity of about 95% in brightness over almost whole of the light exit surface.

Another measurement was performed for the arrangement shown in FIG. 3 under the condition that a prismatic element (having the vertical angle of about 62°), a light diffusion sheet and a commercially available fluorescent lamp were employed to give a result showing the brightness about 4100 candela over almost whole of the light exit surface.

As proved by the above examples, a light scattering and guiding light source devices in accordance with the present invention provide a bright and uniform surface light source. Therefore, it is obvious that such a light source device used as a backlight means for a liquid crystal display gives a high display quality with low electric power consumption. To verify this, a backlight source used in a commercially available 4-inch liquid crystal TV set was replaced by the backlight source of the present example. The brightness of the viewing screen was increased and the quality of the displayed image was improved greatly.

INDUSTRIAL APPLICABILITY

According to the present invention, a bright light scattering and guiding light source device of highly uniform brightness can be realized by adding simple contrivances to the shape of a light scattering guide used therein and by employing an appropriate exit direction modifying means together.

As can be seen in the items (3) and (4) described above, the light scattering guide as the main part of the light scattering and guiding light source in accordance with the present invention can be fabricated by th use of conventional plastic molding techniques such as injection molding and extrusion molding. Therefore, it can be said that the novel device is much superior in economy and easiness of mass production to the prior art light scattering and guiding light source device which needs considerable cost to obtain a high uniformity in brightness.

Where a light scattering and guiding light source device in accordance with the present invention is mounted behind a liquid crystal display as a backlight source, the light scattering and guiding light source device forming the backlight source emits brightly, thus improving the display quality on the liquid crystal display. Since a light scattering guide used in the present invention has a thinned portion, it is made smaller and lighter compared with conventional light scattering guides having the same incident surface area as said light scattering guide. Consequently, the light scattering guide itself saves the material and can make a liquid crystal display compact, light and economical, with the guide being incorporated.

I claim:
1. A light scattering and guiding light source device comprising:
   a light source element; and
   a light scattering guide having a wedge shape, a light incident surface for receiving light from the light source element, a light exit surface and an inclined surface, the light incident surface being at a thick end of the wedge shape such that the thickness of the light scattering guide decreases with increasing distance from the light incident surface,
   the light exit surface and the inclined surface extending from the light incident surface with the inclined surface being inclined with respect to the light exit surface,
   the light scattering guide having a uniform scattering power greater than zero inside to provide three dimensional scattering to light travelling through the light scattering guide such that light received from the light source element at the light incident surface is emitted uniformly from the light exit surface.

2. A light scattering and guiding light source device as claimed in claim 1, further comprising a light exit direction modifying element provided along the light exit surface to modify a travelling direction of the light emitted from the light exit surface so that the light will travel in a direction generally perpendicular to the light exit surface.

3. A light scattering and guiding light source device according to claim 2, wherein the light exit modifying element is provided as a unitary structure with the light scattering guide.

4. A light scattering and guiding light source device as claimed in claim 2, wherein the light exit direction modifying element is provided as a separate structure from the light scattering guide.

5. A liquid crystal display device, comprising:
   a light source element;
   a light scattering guide having a wedge shape, a light incident surface for receiving light from the light source element, a light exit surface and an inclined surface, the light incident surface being at a thick end of the wedge shape such that the thickness of the light scattering guide decreases with increasing distance from the light incident surface, the light exit surface and the inclined surface extending from the light incident surface with the inclined surface being inclined with respect to the light exit surface, the light scattering guide having a uniform scattering power greater than zero inside to provide three dimensional scattering to light travelling through the light scattering guide such that light received from the light source element at the light incident surface is emitted uniformly from the light exit surface; and
   a liquid crystal display provided adjacent to the light exit surface of the light scattering guide to receive backlighting from the light emitted from the light exit surface.

6. A liquid crystal display device according to claim 5, further comprising a light exit direction modifying element provided along the light exit surface to modify a travelling direction of the light emitted from the light exit surface so that the light will travel in a direction generally perpendicular to the light exit surface.

7. A liquid crystal display device according to claim 6, wherein the light exit modifying element is provided as a unitary structure with the light scattering guide.

8. A liquid crystal display device according to claim 6, wherein the light exit direction modifying element is provided as a separate structure from the light scattering guide.

* * * * *